(12) United States Patent
Kasuga et al.

(10) Patent No.: US 11,173,881 B2
(45) Date of Patent: Nov. 16, 2021

(54) DISC BRAKE DEVICE

(71) Applicant: ICAN COMPANY LTD., Tokyo (JP)

(72) Inventors: Toshishige Kasuga, Tokyo (JP);
Yasuhiro Azuma, Tokyo (JP)

(73) Assignee: ICAN COMPANY LTD., Tokyo (JP)

( * ) Notice: Subject to any disclaimer, the term of this patent is extended or adjusted under 35 U.S.C. 154(b) by 132 days.

(21) Appl. No.: 16/621,241

(22) PCT Filed: Apr. 5, 2018

(86) PCT No.: PCT/JP2018/014633
§ 371 (c)(1),
(2) Date: Dec. 11, 2019

(87) PCT Pub. No.: WO2018/230114
PCT Pub. Date: Dec. 20, 2018

(65) Prior Publication Data
US 2020/0101947 A1    Apr. 2, 2020

(30) Foreign Application Priority Data

Jun. 16, 2017 (JP) .............................. JP2017-118666
Oct. 10, 2017 (JP) .............................. JP2017-197147

(51) Int. Cl.
*F16D 55/02*    (2006.01)
*B60T 1/06*    (2006.01)
(Continued)

(52) U.S. Cl.
CPC .......... *B60T 1/065* (2013.01); *F16D 55/2255* (2013.01); *F16D 59/02* (2013.01); *F16D 65/18* (2013.01)

(58) Field of Classification Search
CPC .. F16D 55/2245; F16D 55/2255; F16D 59/02; F16D 2125/64; F16D 65/56
See application file for complete search history.

(56) References Cited

U.S. PATENT DOCUMENTS 3,968,864 A * 7/1976 Deichsel .................. B66D 5/14
188/71.9
5,660,250 A * 8/1997 Treude ................ F16D 55/2245
188/72.9
(Continued)

FOREIGN PATENT DOCUMENTS

JP         S597924 U1    1/1984
JP      H07229527 A     8/1995
(Continued)

OTHER PUBLICATIONS

Ican Company Ltd., "Super-Stop IB30 & IB31", searched on May 22, 2017, <http://www.ican.co.jp/ican_wp/wp-content/uploads/2014/03/SUPERSTOP_IB30andIB31_-DiscBrakeJP.pdf>.
(Continued)

*Primary Examiner* — Nicholas J Lane
(74) *Attorney, Agent, or Firm* — Isshiki & Partners; Joseph P. Farrar

(57) ABSTRACT

A disc brake device has brake linings attached to brake levers that open and close in the lateral direction and sandwich a brake disc. A linking mechanism including a coupling device including lever mechanisms and a spindle opens and closes in conjunction with the lifting and lowering operation of a rod of a thruster, and the spindle is rotated in one direction by a one-way clutch in accordance with the relative displacement between the lever mechanisms and the coupling device to shorten an overall length of the coupling device, the rotation of the spindle is transmitted to an adjustment bolt screwed to a stopper on the lower end sides of the left and right brake levers via a flexible shaft, and the adjustment bolt protrudes downward with respect to the stopper.

6 Claims, 13 Drawing Sheets

(51) Int. Cl.
*F16D 55/2255* (2006.01)
*F16D 59/02* (2006.01)
*F16D 65/18* (2006.01)

(56) References Cited

U.S. PATENT DOCUMENTS

| | | | | |
|---|---|---|---|---|
| 5,782,321 | A | * | 7/1998 | Treude ................ F16D 55/2245 188/196 B |
| 6,112,861 | A | * | 9/2000 | Tomoe ................ F16D 55/2245 188/196 B |
| 2007/0176456 | A1 | | 8/2007 | Ohtsubo et al. |
| 2017/0016499 | A1 | * | 1/2017 | Akyol ................ F16D 55/2245 |

FOREIGN PATENT DOCUMENTS

| | | |
|---|---|---|
| JP | H09105433 A | 4/1997 |
| JP | H1137186 A | 2/1999 |
| JP | 2007203968 A | 8/2007 |
| JP | 2016540167 A | 12/2016 |

OTHER PUBLICATIONS

Gaus Industrial Systems Co., Ltd., "IB30 & IB31 series", searched on May 22, 2017, <http://www.egaius.co.kr/sinye_Shopping_sangpum/1264998848-7.pdf>.
International Search Report (ISR) for Application No. PCT/JP2018/014633 dated Jul. 10, 2018.
Translation of the ISR for Application No. PCT/JP2018/014633 dated Jul. 10, 2018.
Written Opinion of the International Search Authority for Application No. PCT/JP2018/014633 dated Jul. 10, 2018.

* cited by examiner

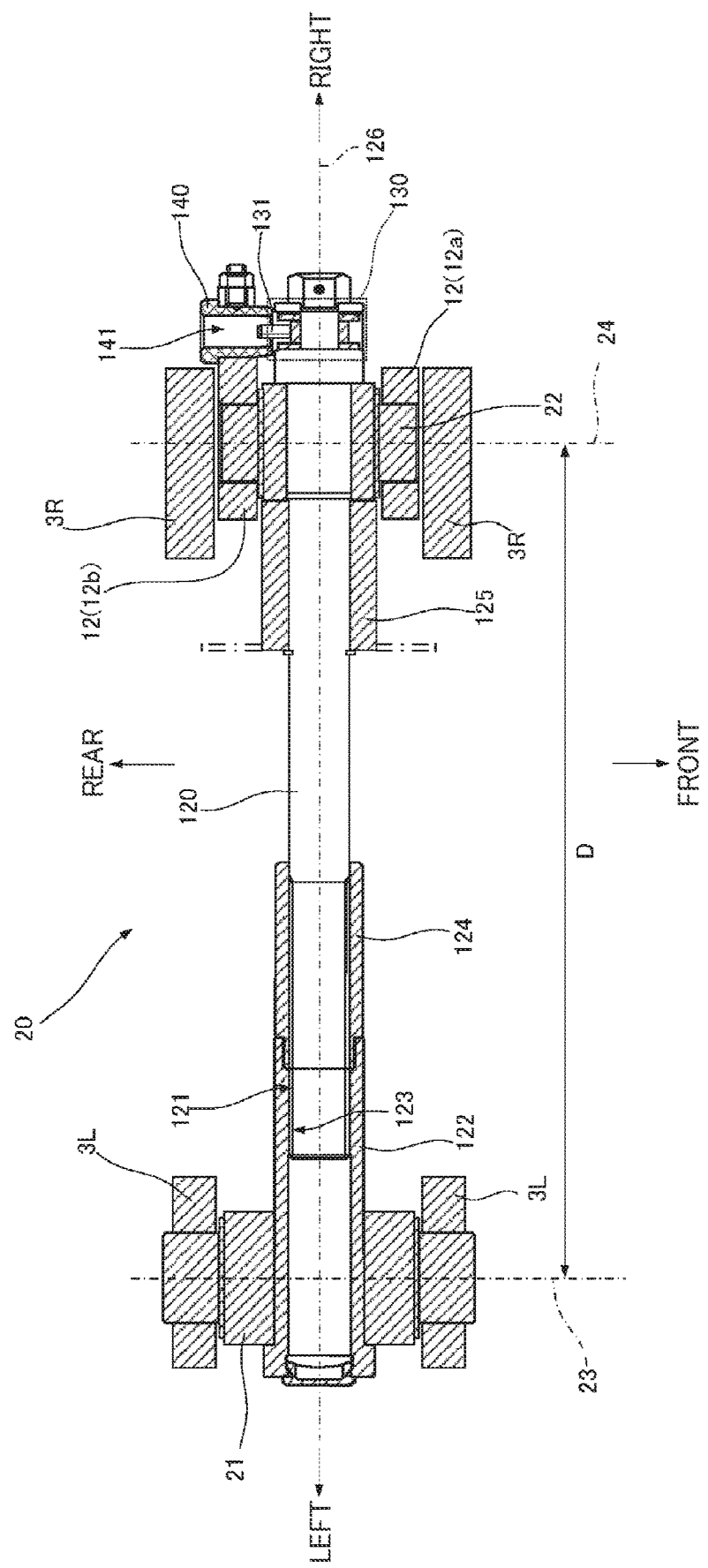

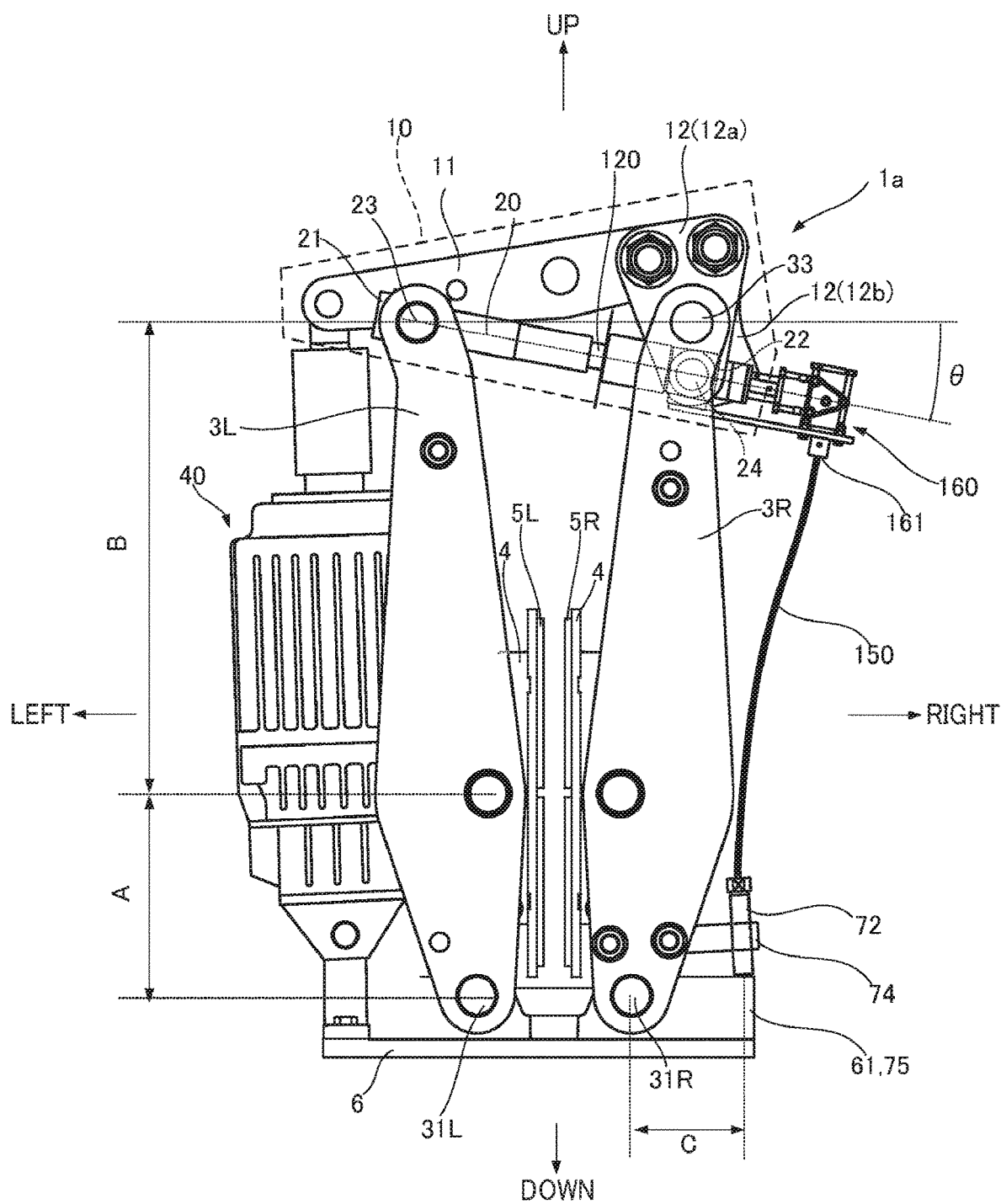

DISC BRAKE DEVICE

CROSS-REFERENCE TO RELATED APPLICATIONS

This patent application is based on and claims priority to Japanese Patent Application Nos. 2017-118666, filed on Jun. 16, 2017, and 2017-197147, filed on Oct. 10, 2017 in the Japan Patent Office, the entire disclosures of which are hereby incorporated by reference herein.

TECHNICAL FIELD

The present invention relates to a disc brake device for heavy equipment such as hoists.

BACKGROUND OF THE INVENTION

A disc brake generates braking force by sandwiching both front and rear surfaces of a rotary brake disc connected to a driven body (for example, a wheel, a belt, etc.) to be braked with brake linings as a friction material. FIG. 1A and FIG. 1B are explanatory diagrams illustrating the operation of the disc brake device 1. FIG. 1A and FIG. 1B are enlarged views of a main part of a disc brake device 1. FIG. 1A shows the disc brake device 1 in a braking state, and FIG. 1B shows the disc in a state in which braking is released. In the following description, it is assumed that the plane including the front, rear, left and right directions is a horizontal plane, and the axis of rotation 100 of a brake disc 2 extends laterally. FIGS. 1A and 1B show front views when the disc brake device 1 placed on a horizontal plane is viewed from the longitudinal direction. Note that, in the drawings indicated below, the same or similar parts may be denoted by the same reference numerals and redundant description may be omitted. In some drawings, unnecessary symbols may be omitted from the description.

As illustrated in FIGS. 1A and 1B, a pair of brake levers (3L, 3R) extending upward are disposed opposite each other on the left and right sides of the brake disc 2. Brake linings (5L, 5R) are attached to the brake disc 2 via brake shoes 4 on extensions of each of the left and right brake levers (3L, 3R). The left and right brake levers (3L, 3R) have front and rear rotational shafts (31L, 31R) at the lower ends, and are linked via a linking mechanism (not shown) connected to the upper ends so as to swing out to the left and right. The linking mechanism is configured to be driven by a predetermined driving device.

As illustrated in FIG. 1A, in the braking state, the left and right brake levers (3L, 3R) swing toward each other so that the brake linings (5L, 5R) close, sandwiching the brake disc 2 therebetween. When the braking state is released, as illustrated in FIG. 1B, the left and right brake levers (3L, 3R) swing away from each other and a gap (hereinafter, also referred to as a gap x) is generated between the brake disc 2 and the brake linings (5L, 5R) in the open state.

As a prior art document of the present application, there is Patent Document 1 (Japanese Patent Laid-Open No. 11-37186). Patent Document 1 describes a linking mechanism in a disc brake device, and the basic configuration and structure of the linking mechanism of the disc brake device according to the embodiment of the present invention is similar to that described in Patent Document 1. Below, in order to further an understanding of the present invention, the structure and configuration of the linking mechanism of the disc brake device described in Patent Document 1 and the operation of these mechanisms is described. For ease of comprehension, the rotational center in any rotation mechanism or the structure, parts, members, etc., for forming the rotational center of the rotation mechanism is referred to as an "axis of rotation" unless otherwise specified.

FIGS. 2A, 2B are diagrams showing perspective views of the overall configuration of the disc brake device 1 when the disc brake device 1 is viewed from different directions. As illustrated in FIGS. 2A and 2B, the disc brake device 1 includes various devices and mechanisms including the brake levers (3L, 3R) attached via various brackets fixed at appropriate positions on a base plate 6. The two brake levers (3L, 3R) are composed of two identical planar members facing front and rear, and the two planar members are connected via bolts 32 extending in the longitudinal direction. The lower ends of the brake levers (3L, 3R) are attached via separate rotary shafts (31L, 31R) provided to a single shared bracket 61. A linking mechanism 10 that swings the left and right brake levers (3L, 3R) so as to approach and separate from each other is disposed on the upper end side of the brake levers (3L, 3R).

The linking mechanism 10 in the disc brake device 1 shown is composed of four planar levers (11a, 11b, 12a, 12b) having surfaces in vertical and horizontal directions and a rod-shaped coupling device 20 extending in the lateral direction at an angle. The four planar levers (11a, 11b, 12a, 12b) are fixed to each other by bolts 13 penetrating in the longitudinal direction and operate together as a single unit. The four levers (11a, 11b, 12a, 12b) have a pair of bent levers 11 that are extended over the left and right brake levers (3L, 3R) while facing each other in the longitudinal direction, and a pair of short levers 12 shorter in the lateral direction than the bent levers 11 while facing in the longitudinal direction.

Here, as illustrated in the figure, the short lever 12 attached to the brake lever 3R on the right side defines the respective directions of left and right, and when viewing the rear from the front, the front and rear directions are defined so that the left and right directions coincide with each other, such that the short lever 12 has a shape protruding downward with respect to the bent lever 11 and is attached to the front right side of the pair of bent levers 11. Accordingly, the four levers (11a, 11b, 12a, 12b) are formed so as to be L-shaped with the right end bent downward when viewed as a single unit. The pair of short levers 12 is disposed between the two front and rear planar lever members constituting the right brake lever 3R, and further, in the region below the bent lever 11, is pivotally supported by a rotary shaft 33 on the upper end side of the brake lever 3R.

The rod-shaped coupling device 20 constituting the linking mechanism is extended towards the upper left from between the two short levers (12a, 12b) together with the bent lever 11 and the short lever 12. At both the left and right ends of the coupling device 20, crosspieces (21, 22) having rotary shafts in the longitudinal direction are attached to the front end surface and the rear end surface of rectangular box-shaped block members, respectively. The crosspieces (21, 22) shown in the figure have a shape in which cylindrical shafts serving as rotary shafts (23, 24) protrude from the front and rear ends of rectangular box-shaped housings, and the rotary shaft 23 of the crosspiece 21 on the left end side is rotatably inserted into shaft holes formed in the upper ends of the two front and rear planar members constituting the left brake lever 3L. The rotary shaft 24 is rotatably inserted into shaft holes formed in the front and rear two short levers (12a, 12b).

The position of the rotary shaft 24 of the right crosspiece 22 is located below the rotary shaft 33 for supporting the short lever 12 in the brake lever 3R on the right side. The vertical position where the left crosspiece 21 of the coupling device 20 is pivotally supported in the left brake lever 3L and the vertical position where the short lever 12 is pivotally supported in the right brake lever 3R are the same. The left and right brake levers (3L, 3R) swing so as to approach or separate from each other by interlocking with the linking mechanism 10 having the above-described configuration. In general, the left end of the bent lever 11 is moved up and down by a predetermined power source, so that the left and right brake levers (3L, 3R) swing so as to be separated from and approach each other. In the illustrated disc brake device 1, a thruster 40 that raises the left end side of the bent lever 11 is used as a power source for operating the linking mechanism 10 to release the braking state of the brake disc 2. A spring mechanism 50 is used for maintaining the closed state when the thruster 40 is not operating.

The thruster 40 is constituted by an electric actuator or the like, and when the thruster 40 is operated, a rod 41 extending in the vertical direction is extended upward. The thruster 40 has a rotary shaft 42 extending in the longitudinal direction at the lower end of the thruster 40, and is rotatably attached to a bracket 62 provided on the left rear side of the base plate 6, such that a slight swing in the lateral direction accompanying the operation of the linking mechanism 10 is allowed. A head 43 disposed between two front and rear bent levers (11a, 11b) is formed at the upper end of the rod 41 and has a rotary shaft 44 in the longitudinal direction and is pivotally supported by the left end of the bent lever 11. In addition, as a structure for pivotally supporting the head 43 with respect to the bent lever 11, an appropriate rotation mechanism such as the above-described crosspiece can be used.

The spring mechanism 50 includes a hollow rectangular tube-shaped case 51 having a cylindrical axis in the vertical direction, a spring having a spiral axis in the vertical direction and housed in the housing, and a connection mechanism for transmitting to the linking mechanism 10 a later-described expansion/contraction motion of the spring. A lower end side the rectangular cylindrical case (hereinafter also referred to as the spring case 51) is attached to a bracket 63 provided on the rear of the base plate 6 in the vicinity of the center in the lateral direction. Like the thruster 40, the spring case 51 is pivotally supported on the bracket 63 so as to be able to swing slightly in the lateral direction with the action on the linking mechanism 10. The bent lever 11 is always urged downward by a spring and a rod (not shown) housed in the spring case 51.

Next, the operation of the brake lever via the linking mechanism 10 is described. FIG. 3 shows a front view of the disc brake device. The brake levers (3L, 3R) are generally swung so that the left and right brake levers (3L, 3R) are separated from and approach each other by moving the left end side of the bent lever 11 upward and downward. Specifically, as shown by the black arrow in FIG. 3, when the thruster 40 is operated, the left end of the bent lever 11 rises against the downward biasing force of the spring mechanism 50 (s1). As the left end of the bent lever 11 rises, the bent lever 11 and the short lever 12 are together rotated clockwise with the rotary shaft 33 of the short lever 12 pivotally supported by the right brake lever 3R as a fulcrum (s2).

Since the right end of the coupling device 20 is pivotally supported at a position below the rotary shaft 33 of the short lever 12, the coupling device moves to the left as the bent lever 11 and the short lever 12 rotate (s3). Since the left end of the coupling device 20 is pivotally supported by the upper end of the left brake lever 3L, the upper end of the left brake lever 3L is urged to the left (s4). As a result, the right lever 3R also receives a reaction force and swings to the right. That is, the brake levers (3L, 3R) are swung away from each other (s5), and the disc brake device 1 is in the open state in which the braking state is released.

On the other hand, when the thruster is put into the non-operating state by powering down or the like, as indicated by the whited-out arrows in the figure the bent lever 11 connected to the upper end of the rod of the spring mechanism 50 is biased downward (s11), the rod 41 of the thruster 40 is lowered (s12), and the bent lever 11 and the short lever 12 are together rotated counterclockwise with the rotary shaft 33 of the short lever 12 as a fulcrum. (s13). As the levers (11, 12) rotate, the right end of the coupling device 20 is pushed to the right (s14) and the upper end of the left brake lever 3L that pivotally supports the left end of the coupling device 20 is urged to the right (s15). As a result, the left and right brake levers (3L, 3R) swing toward each other (s16), the brake disc 2 is sandwiched between the brake linings (5L, 5R) attached to the brake levers (3L, 3R) via the brake shoe 4, and the disc brake device 1 is in the closed state.

However, in the disc brake device 1 having the aforementioned linking mechanism 10, as the brake linings (5L, 5R) wear out the distances between the left and right brake levers (3L, 3R) in the closed state gradually decreases. Therefore, the included angle $\alpha$ between the left and right brake levers (3L, 3R) in the closed state gradually decreases. That is, the left end of the bent lever 11 in the closed state gradually falls downward. If wear progresses and the rod 41 of the thruster 40 descends to the bottom dead center, the angle $\alpha$ between the left and right brake levers (3L, 3R) cannot be reduced. For this reason, the frictional force when the rotating brake disc 2 is sandwiched by the brake linings (5L, 5R) decreases, and there is a possibility that the brake disc 2 cannot be reliably operated.

Thus, the disc brake device described in Patent Document 1 is provided with an automatic wear adjustment device (hereinafter also referred to as an AWA device) that automatically adjusts the distance between the left and right brake levers in the braking state depending on the state of wear of the brake linings so that the rod thruster does not reach the bottom dead center even when the brake linings are worn. The AWA operates to gradually shorten the length of the coupling device as the brake linings gradually wear out, thereby reducing the included angle between the left and right brake levers in the open state while maintaining a constant difference between the left and right brake levers in the each of the open state and the closed state. The AWA mechanism and configuration are described in detail in Patent Document 1.

Further, the disc brake device described in Patent Document 1 also includes a mechanism for rotating the left and right brake levers symmetrically about the brake disc. In general, when the length of the coupling device is shortened by the AWA and the angle between the left and right brake levers in the open state becomes narrower, the downward biasing force of the spring acts asymmetrically in the lateral direction on the linking mechanism and in some cases, the left and right brake levers are tilted toward the right brake lever as a whole. In other words, the AWA is designed to maintain a constant angle between the left and right brake levers in the open state and the closed state, and the left and right brake levers do not always swing symmetrically about the brake disc. When the left and right brake levers as a whole are tilted toward one brake lever or the other, the brake linings are reduced lopsidedly. Since it is necessary to replace the brake linings with a left and right pair, the frequency of replacement of the brake linings increases, as does the cost of maintenance.

Therefore the disc brake device described in Patent Document 1 is provided with an Automatic Wear Centering Device (hereinafter also referred to as ACD) on the lower end of the right side of the lever so that the right and left brake levers are automatically adjusted so as to swing symmetrically toward the brake disc device. The ACD is covered with a box-like cover 7 disposed below the right brake lever 3R in the disc brake device 1 shown in FIG. 2. FIG. 4 is an enlarged perspective view of the lower right side of the disc brake device 1, and shows a state in which the cover 7 covering the ACD is removed.

As illustrated in FIG. 4, the main body of the ACD 70 is a rack and pinion 71 installed on the lower end side of the right brake lever 3R, and a male screw is formed around the vertical axis. A pinion 73 is attached to the upper end side of an adjustment bolt 72. The male screw of the adjustment bolt 72 is screwed from above into a block-like member (hereinafter also referred to as a stopper 74) that protrudes toward the right outer side at the lower end of the right brake lever 3R, and its lower end protrudes below the stopper 74.

On the base plate 6, a pedestal 75 for receiving the lower end of the adjustment bolt 72 is provided immediately below the stopper 74. In this example, the bracket 61 that pivotally supports the lower ends of the left and right brake levers (3L, 3R) also serves as the aforementioned pedestal 75. The operating principle of the ACD 70 is that, when the adjustment bolt 72 is rotated in the screwing direction, the lower end of the adjustment bolt 72 is brought into contact with the pedestal 75 in the open state to restrict the swinging of the right brake lever 3R to the right. Then, the swinging of the left brake lever (FIG. 2, reference numeral 3L) coupled to the right brake lever 3R via the linking mechanism (FIG. 4, reference numeral 10) is also restricted, and the left and right brake levers (3L, 3R) are adjusted to be symmetrical with respect to the brake disc (FIG. 2, reference numeral 2).

In the ACD 70, to automatically adjust the position of the brake levers (3L, 3R) according to the above-described principle, the pinion 73 is attached to the upper end of the adjustment bolt 72 through a one-way clutch. If the adjustment bolt 72 is a right-handed thread, and if the pinion 73 is rotated in the clockwise direction when viewed from above, then the adjustment bolt 72 rotates in a direction to be screwed in via the one-way clutch. In the counterclockwise direction, the one-way clutch rotates idly, and the adjustment bolt 72 does not rotate and the length of the bolt 72 protruding below the stopper 74 is maintained. On the other hand, the rack 76 that meshes with the pinion 73 is fixed to the base plate 6. Then, when the left and right brake levers (3L, 3R) are opened and closed in the lateral direction in accordance with movement to the open state and the closed state in the disc brake device 1, the pinion 73 is engaged with the stopper 74 by meshing with the rack 76. That is, if the pinion 73 is rotated in the fastening direction, that is, the direction in which the pinion 73 is screwed, the proper inclination of the brake levers (3L, 3R) is restored.

FIGS. 5A-5D illustrate schematically the operation of the ACD, showing a top view when the rack and pinion 71 which comprises the ACD is seen from above. In the closed state shown in FIG. 5A and the closed state shown in FIG. 5B, the position of the pinion 73 relative to the rack 76 in the lateral direction changes as indicated by the thick line arrows. If the brake linings are not in a worn condition, the relative displacement is within backlash W. Accordingly, when there is no wear on the brake linings, the pinion 73 does not rotate and the adjustment bolt 72 does not rotate.

However, as the above-described AWA operates due to wear of the brake linings and the included angle between the left and the right brake levers narrows further, at a certain point the relative positions of the pinion 73 and the rack 76 exceed the backlash W set between the two. At that time, in the closed state, the right brake lever swings more to the left and as illustrated in FIG. 5C the pinion 73 is greatly displaced to the left with respect to the rack. Then, the left edge of the tooth of the pinion 73 abuts the right edge of the tooth of the rack 76 and the pinion 73 rotates clockwise as viewed from above. The one-way clutch 77 rotates the adjustment bolt 72 in the same direction when moving clockwise when viewed from above. As a result, the lower end of the adjustment bolt 72 protrudes beyond the stopper and comes into contact with the upper surface of the pedestal at a stage when the rightward swinging angle of the right brake lever is smaller. That is, the right brake lever is prevented from tilting excessively to the right.

Further, as illustrated in FIG. 5D, in the open state, the right edge of the tooth of the pinion 73 contacts the left edge of the tooth of the rack 76 so that even when the pinion 73 is rotated counterclockwise as viewed from above, the one-way clutch 77 rotates idly when rotating counterclockwise as viewed from above and the adjustment bolt 72 does not rotate. Then, the rotation angle of the pinion 73 in the counterclockwise direction decreases with each opening and closing. Ultimately, as illustrated in FIGS. 5A and 5B, the relative disposition of the pinion 73 and the rack 76 is kept within the backlash W and the pinion 73 stops rotating.

It should be noted that a disc brake device substantially equivalent to the disc brake device described in Patent Document 1 is provided as a product, as described in Non-Patent Documents 1 and 2.

PRIOR ART DOCUMENTS

Patent Documents

Patent Document 1 Japanese Patent Application Laid-Open No. 11-37186

Non-Patent Documents

Non-Patent Document 1 Nippon ICAN Co., Ltd., "SUPER-STOP IB30 & IB31", [online], [searched on May 22, 2017], internet <URL: http://www.ican.co.jp/ican_wp/wp-content/uploads/2014/03/SUPERSTOP_IB30andIB31_-DiscBrakeJP.pdf>

Non-Patent Document 2 GAUS INDUSTRIAL SYSTEMS CO. LTD., "IB30 & IB31 series", [online], [Search May 22, 2017], Internet <URL: http://www.egaius.co.kr/sinye_Shopping_sangpum/1264998848-7.pdf>

SUMMARY OF THE INVENTION

Problem the Invention is to Solve

The disc brake device described in Patent Document 1 is equipped with AWA and ACD and can maintain a constant, lateral symmetrical distance between the brake disc and the brake linings even as the brake linings wear down. However, the surface of the brake disc is not necessarily perpendicular to the axis of rotation over the entire surface of the disc. Even if it is very slight, there are many cases where the surface of the brake disc has minute irregularities and undulations, and the angle between the rotary shaft and the surface of the brake disc is not 90°. As a result, the position of the surface of the brake disc with which the brake linings come into contact changes every time the brake disc is closed. Therefore, the inclination of the left and right brake levers is slightly displaced in the lateral direction depending on the rotational position of the brake disc in the closed state. If the displacement exceeds the backlash allowed in the ACD, there is a possibility that the ACD malfunctions and unnecessarily rotates in the direction in which the adjustment bolt is screwed. As a result, the left and right brake levers cannot be opened and closed symmetrically.

In the case of the disc brake device shown in FIG. 3, the left and right brake levers in the closed state are generally tilted to the left and the right brake lining is partially reduced. In the open state, if the left and right brake levers are generally tilted to the left, the right brake lining may touch the surface of the brake disc, which is not necessarily a flat surface. If the brake lining touches the rotating brake disc it may destabilize the operation of the driven body to be braked that is rotating the brake disc.

The present invention has as its object to provide a disc brake device that can maintain a constant difference in the included angle between the left and right brake levers as between the operating state and the state of release the even as the brake linings wear down, and moreover keep the brake levers laterally symmetrical about the brake disc.

Solving the Problem

To achieve the above-described object, one aspect of the present invention provides a disc brake device that sandwiches a brake disc between left and right brake linings disposed opposite and facing each other across the brake disc in the lateral direction to brake the rotation of the brake disc, with the disc brake device comprising:

left and right brake levers each having rotary shafts extending in the longitudinal direction at lower ends thereof, with a brake lining installed on each of the left and right brake levers;

a linking mechanism that alternately swings the left and right brake levers toward and away from each other;

a thruster that causes the linking mechanism to move the left and right brake levers away from each other so that the brake is released in an open state;

a spring mechanism that causes the linking mechanism to move the left and right brake levers toward each other to brake in a closed state when the thruster is not operating;

an automatic wear adjustment device that adjusts an included angle of the left and right brake levers in the open state according to the state of wear of the brake linings;

an automatic gap distribution device that, in the open state, equalizes an interval in the lateral direction between each of the left and right brake linings and the brake disc, wherein the linking mechanism is constituted by a lever mechanism extended in the lateral direction above the left and right brake levers and by a coupling device, the lever mechanism has a rotary shaft extending in the longitudinal direction at one of a left end and a right end thereof and is rotatably supported at an upper end side of one of the left and right brake levers, and is extended toward an upper end side of the other of the left and right brake levers, the coupling device has a rod-shaped axis of rotation that extends in the longitudinal direction toward the other of the left and right ends and is pivotally supported on the upper end side of the other of the left and right brake levers, and has a rotary shaft that extends in the longitudinal direction toward one of the left and right ends and is pivotally supported by one of the left and right ends of the lever mechanism, the thruster is provided with a vertically movable rod an upper end of which is attached via a rotary shaft to an end portion of the other of the left and right ends of the lever mechanism, such that by raising the rod the disc brake device is put in the open state, the spring mechanism is attached at a predetermined position of the lever mechanism via a rotary shaft, and urges the lever mechanism to maintain the closed state by a restoring force of a spring, the coupling device is provided with a spindle having an axis of rotation in a rod-shaped axial direction, and the spindle is rotated in a predetermined direction to reduce an overall length of the coupling device, the automatic wear adjustment device is provided with a one-way clutch that rotates the spindle in one direction only, and rotates the one-way clutch according to the relative displacement of the positions of each of the left and right end portions of the lever mechanism and the coupling device, and the automatic gap distribution device includes an adjustment bolt that passes vertically through a stopper while being screwed into the stopper, which protrudes outward in the left and right direction at the lower end of one of the left and right brake levers; a base that supports a lower end of the adjustment bolt; and a flexible shaft that is interposed between the spindle and the adjustment bolt to interlock the rotation of the spindle and the adjustment bolt, wherein, as the spindle rotates to shorten the coupling device, the adjustment bolt is rotated so as to protrude downward with respect to the stopper.

The disc brake device may be one in which the flexible shaft is a coil-type flexible shaft. Alternatively, the flexible shaft may be a universal joint-type flexible shaft.

A transmission gear may be interposed between the flexible shaft and the spindle. The automatic gap distribution apparatus may cause the adjustment bolt to protrude downward relative to the stopper as the spindle rotates by a predetermined angle according to a ratio between the pitch of the spindle and the pitch of the adjustment bolt. Alternatively, the disc brake device may be provided with a gear mechanism for converting an axis of rotation of the spindle into an axis of rotation extending downward.

Effect of the Invention

According to the disc brake device of the present invention, even if the brake linings wear down, the difference of the included angle between the left and right brake levers between the state of release and during braking, and the brake levers can be kept symmetrical with respect to the brake disc. Other effects will become clear from the following description.

BRIEF DESCRIPTION OF DRAWINGS

FIG. 6 is a view showing a basic structure of a coupling device provided in a disc brake device according to an embodiment of the present invention.

FIG. 9 is a view for explaining dimensions and angles of each part of the disc brake device according to the embodiment of the present invention.

DESCRIPTION OF PREFERRED EMBODIMENTS

Figure 1A:
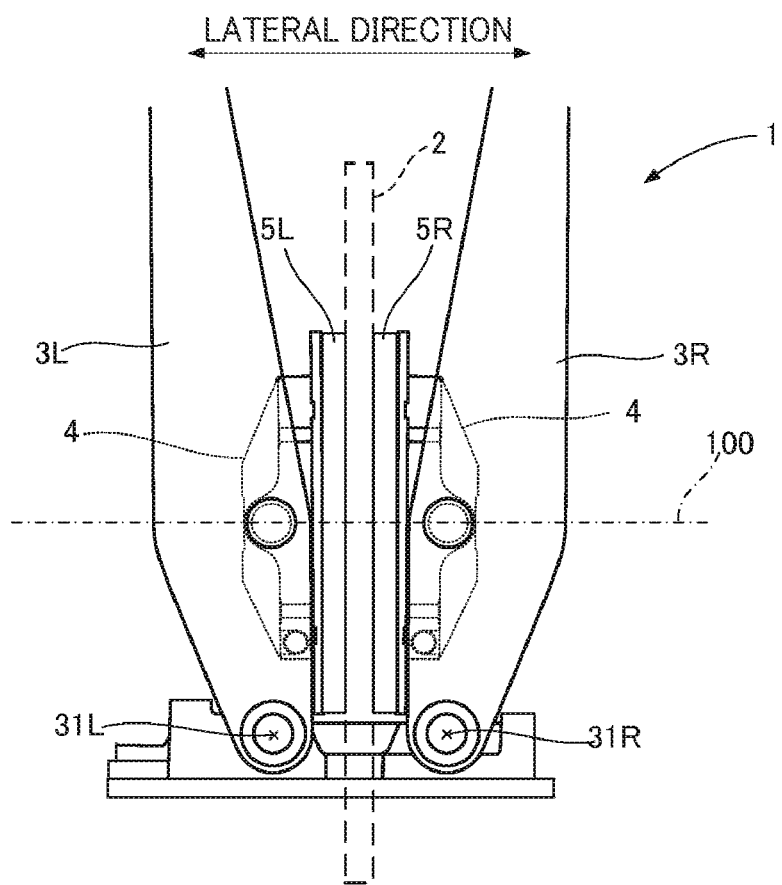
FIG. 1A is a diagram illustrating the basic structure and operation of a disc brake device.
Figure 1B:
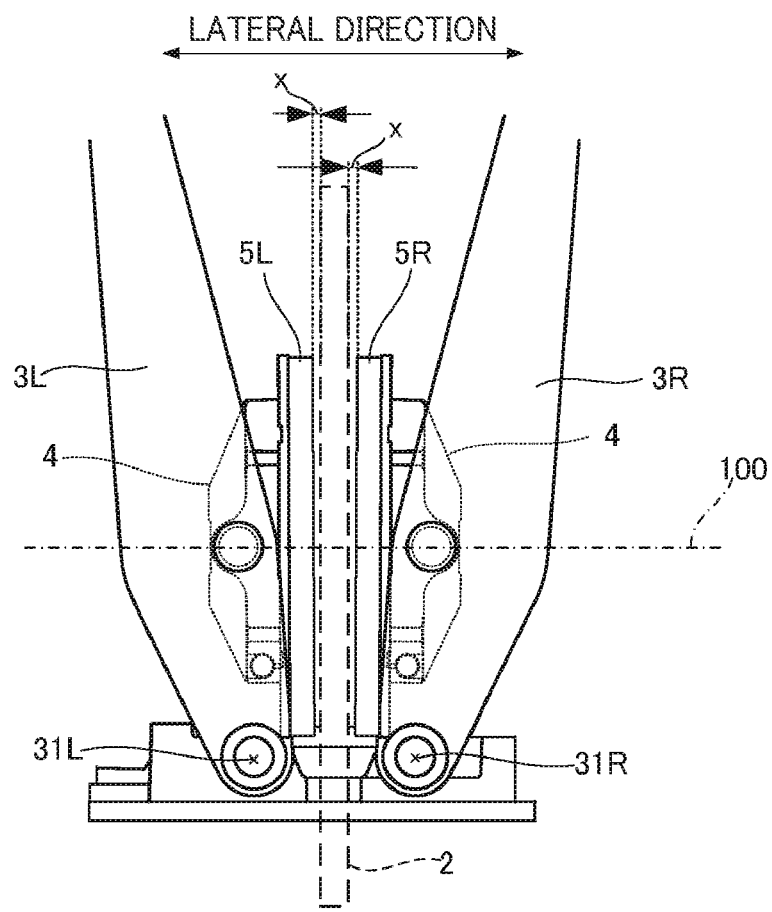
FIG. 1B is a diagram illustrating a basic structure and operation of a disc brake device.
Figure 2A:
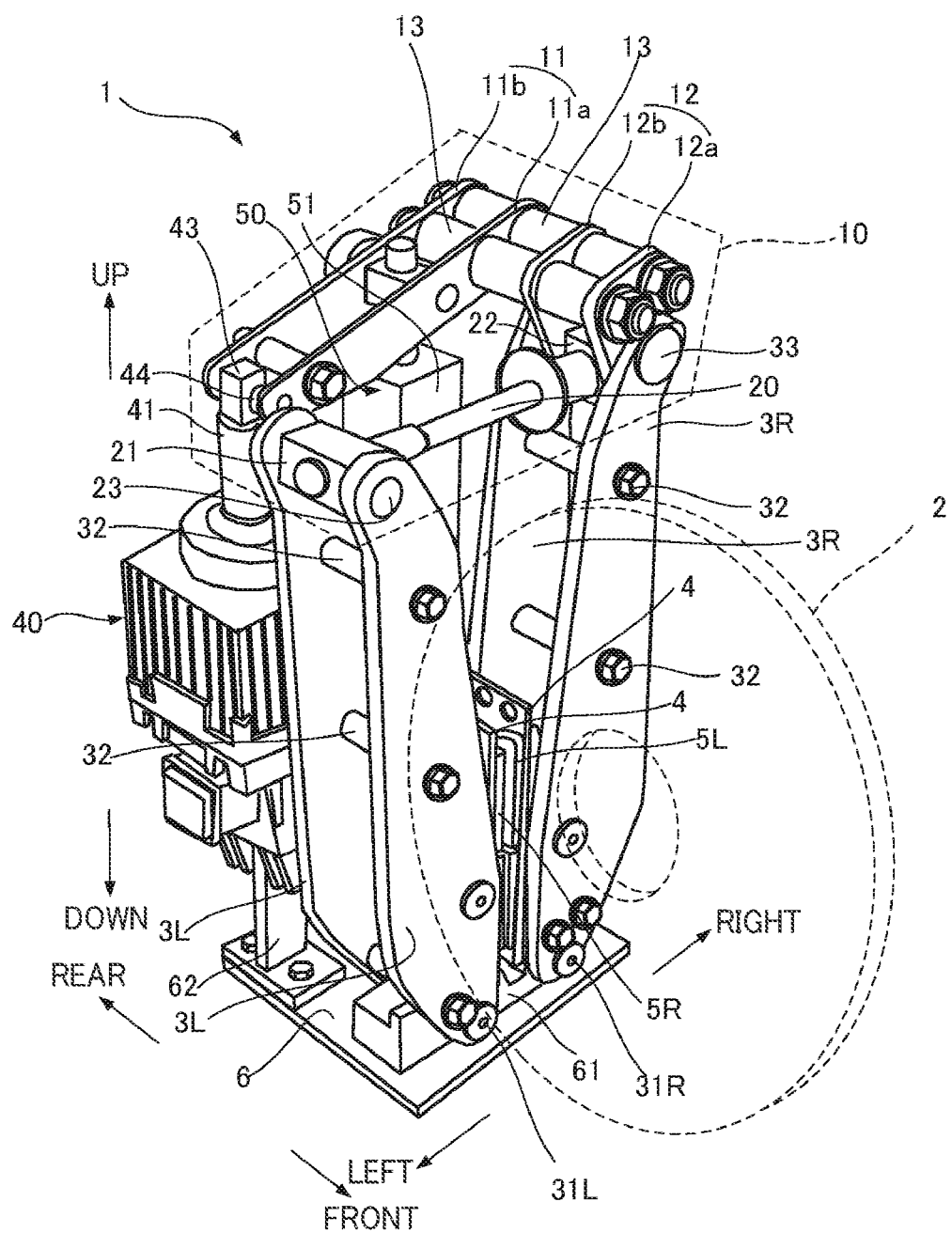
FIG. 2A is a diagram illustrating the overall structure of a conventional disc brake device.
Figure 2B:
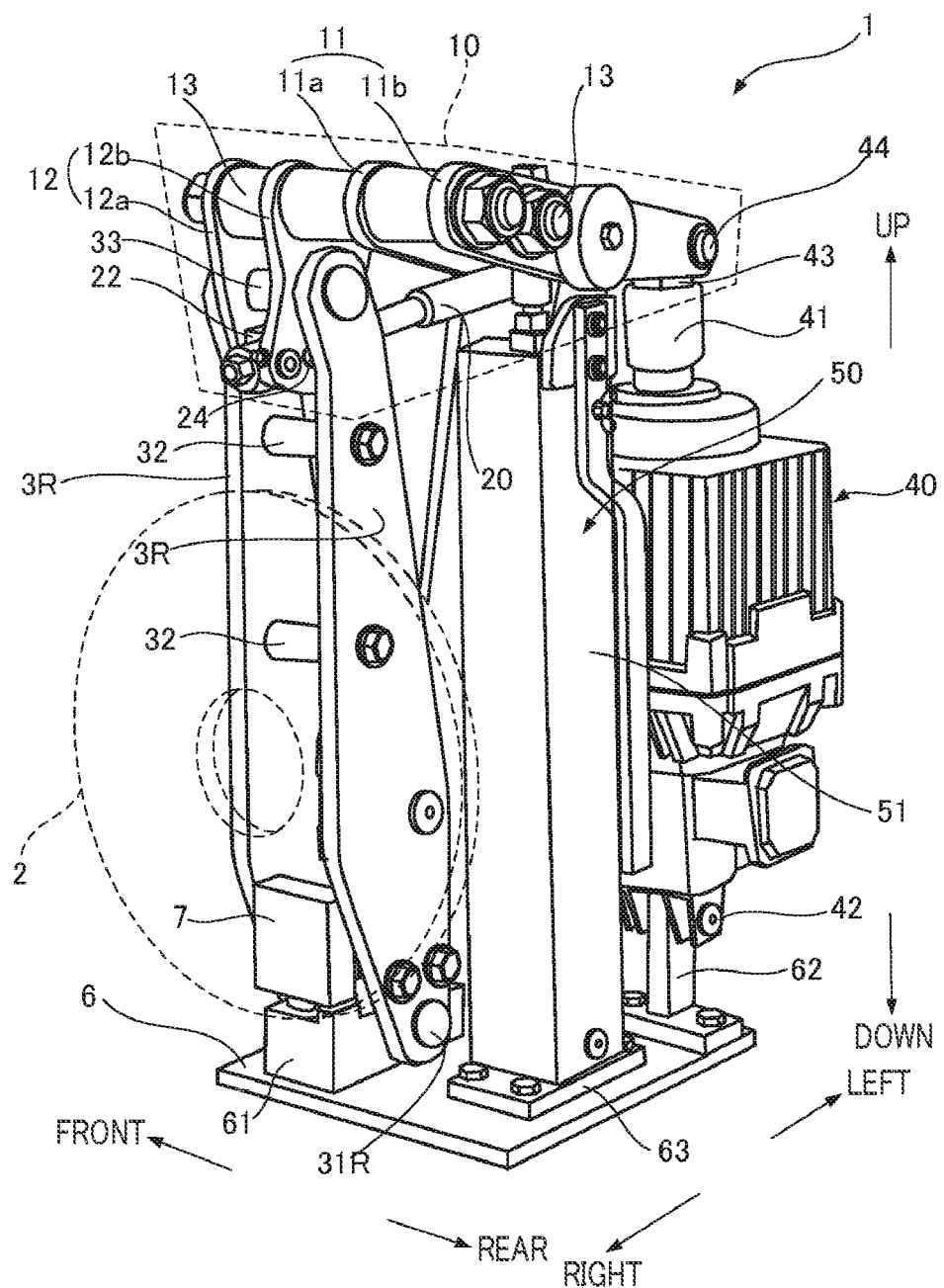
FIG. 2B is a diagram illustrating the overall structure of a conventional disc brake device.

An embodiment of the present invention is described below with reference to the accompanying drawings. Note that in the drawings used for the following description, the same or similar parts may be denoted by the same reference numerals and redundant description may be omitted. In some drawings, unnecessary symbols may be omitted from the description.

The Embodiment

In the conventional disc brake device, even if the opening/closing angle of the brake lever is kept constant by the AWA, there is a possibility that the corrected state of the tilt of the brake levers adjusted by the ACD becomes corrupted in the process of operating the disc brake device. Therefore, the disc brake device according to the embodiment of the present invention has a structure based on the technical concept that, once the inclination of the brake lever is adjusted by the ACD, the adjustment state of the inclination is maintained unless the opening/closing angle of the brake lever is readjusted by the AWA. Schematically, the basic configuration of the disc brake device according to the embodiment of the present invention is the same as the disc brake device described in Patent Document 1 or Non-Patent Documents 1 and 2, and the configuration and structure of the AWA are also substantially the same as those described in the literature. However, by skillful use of the mechanisms and structure of the AWA it becomes possible to eliminate malfunctioning of the ACD. In the following description, first, the mechanism and operation of the AWA is described in detail, and then the configuration, structure, and operation of the disc brake according to the present embodiment is described.

AWA

FIG. 6 is a diagram illustrating a coupling device that operates as an AWA. The figure is a view of the rod-shaped coupling device 20 as viewed from a direction orthogonal to the axis, and corresponds to the direction of arrows a-a in FIG. 3. Further, a part of the coupling device 20 shown in the figure is shown as a cross-section along a plane including the shaft so that the structure can be easily understood. The cross-section corresponds to the cross-section along the line b-b in FIG. 3, and the cross-section is shown by hatching. For the coupling device 20 extending obliquely downward from the right to the left and each member constituting the coupling device 20, the right end is the base end and the left end is the front end. The coupling device 20 includes a spindle 120 having a male screw 121 formed around the periphery of the front end of the spindle 120. The male screw 121 on the front end of the spindle 120 is screwed into a female screw 123 formed on the inner surface of a sleeve (hereinafter also referred to as a threaded sleeve 122) disposed on the front end of the spindle 120. Thereby, the front end side of the spindle 120 is inserted into the base end side of the threaded sleeve 122.

A crosspiece 21 that projects in the longitudinal direction is attached to the threaded sleeve 122, and the front end side of the coupling device 20 is pivotally supported by the upper end of the left brake lever 3L via the crosspiece 21. In this example, a hollow cylindrical sleeve (hereinafter also referred to as a protective sleeve 124) is connected to the base end side of the threaded sleeve 122, and an intermediate portion in the long direction of the spindle 120 is supported by the protective sleeve 124.

The spindle 120 extends from the front end side inserted into the threaded sleeve 122 through the hollow portion of the protective sleeve 124 and obliquely downward to the right to the base end. The spindle 120 is inserted into a sleeve (hereinafter also referred to as a thrust sleeve 125) separate from the previous two sleeves (122, 124) on the way to the base end. A crosspiece 22 similar to the crosspiece 21 attached to the threaded sleeve 122 is connected to the base end side of the thrust sleeve 125. The crosspiece 22 is pivotally supported by the short lever 12. The spindle 120 is inserted into the crosspiece 22 via the thrust sleeve 125 and protrudes further to the right and beyond the base end side of the crosspiece 22. The one-way clutch 130 is mounted on the protruding portion of the spindle 120 so as to be coaxial with an axis of rotation of the spindle 120.

An engagement pin 131 composed of a spring pin is attached to the one-way clutch 130 so as to protrude radially outward with respect to the axis of rotation 126. In addition, a collar stop 140 that accommodates the engaging pin 131 in a loosely fitted state is attached to one of the two short levers (12a, 12b) facing front and rear. In this example, the collar stop 140 is attached to the rear short lever 12b. The collar stop 140 has a hollow cylindrical shape with the longitudinal direction as an axis, and an end surface on the engagement pin 131 side is open. The front end side of the engagement pin 131 is inserted into a hollow portion 141 of the collar stop 140 from the opening. The diameter of the engaging pin 131 is about ⅓ of the inner diameter of the hollow portion 141 of the collar stop 140. In the coupling device 20 shown here, when viewed from the base end toward the front end, when the one-way clutch 130 rotates in the clockwise direction, the spindle 120 also rotates in the same direction. When rotating in the counterclockwise direction, the one-way clutch 130 idles with respect to the spindle 120 and the spindle 120 is not rotated around the axis of rotation.

Next, a description is given of the operation of the AWA. FIGS. 7A to 7D illustrate the principle of operation of the AWA. FIGS. 7A to 7D schematically illustrate a state in which the coupling device 20 and the short lever 12 are viewed from the right side. It should be noted that FIGS. 7A to 7D illustrate the operating states of different AWAs. In the following description, the operation of the AWA is described with reference to FIGS. 7A to 7D and FIGS. 3 and 6 described above.

Figure 3:
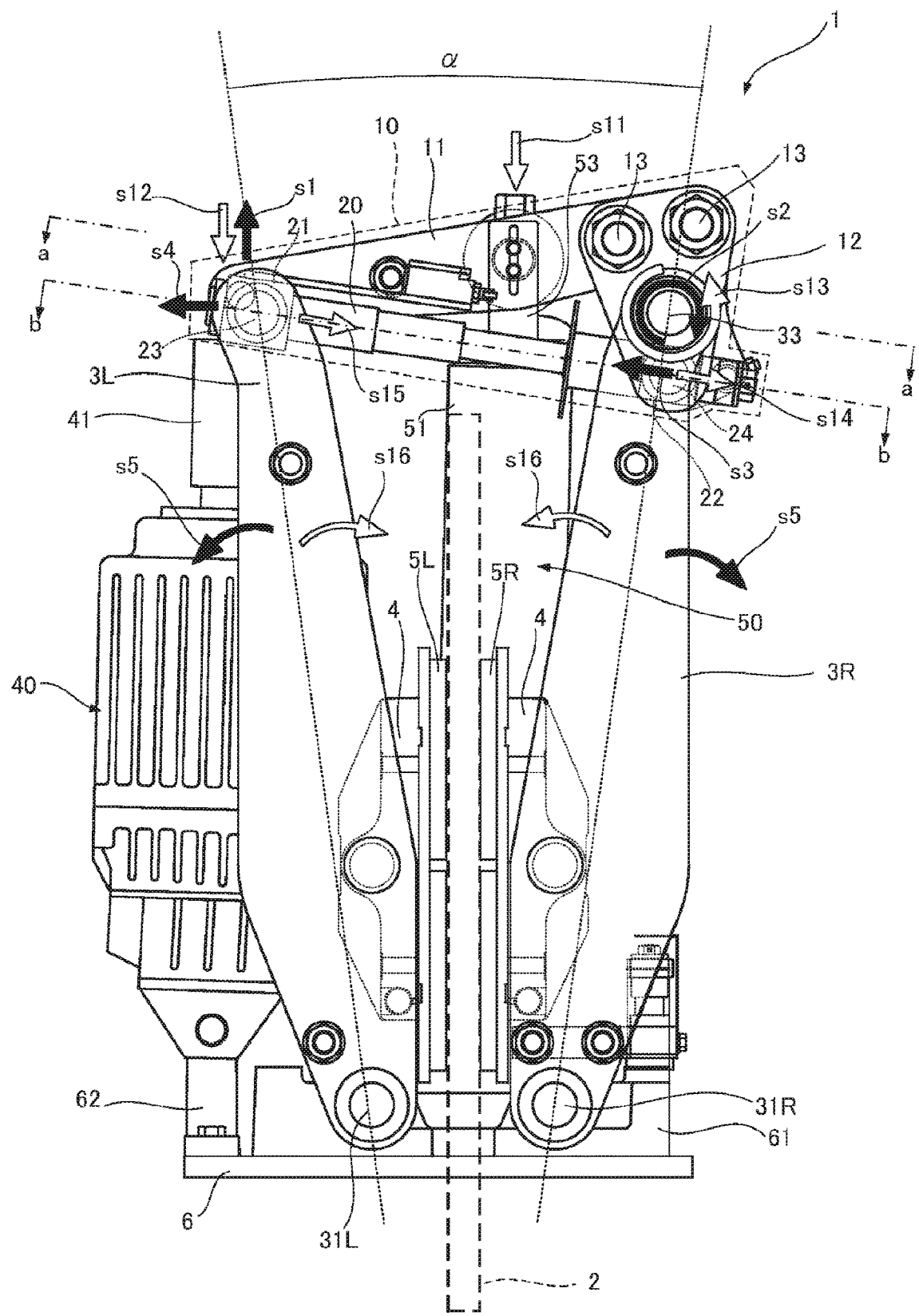
FIG. 3 is a diagram illustrating a specific operation of a conventional disc brake device.
Figure 4:
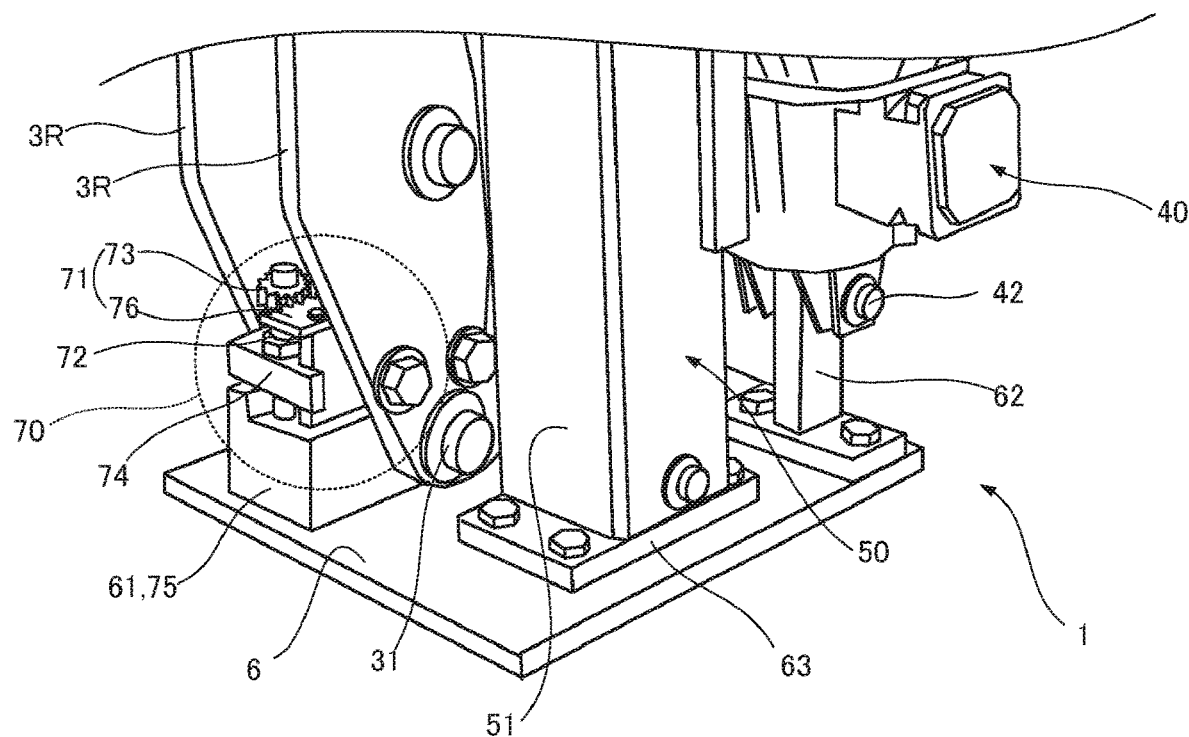
FIG. 4 is a diagram illustrating an outline of an automatic gap distribution device (ACD) constituting a conventional disc brake device.
Figure 5A:
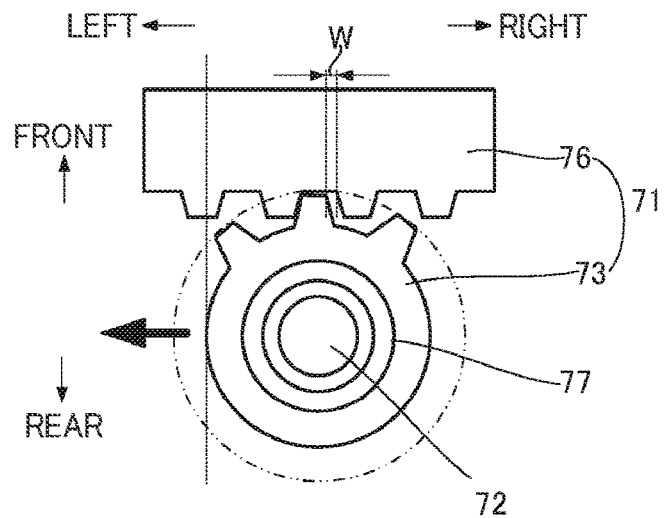
FIG. 5A is a diagram illustrating operation of the automatic gap distribution device (ACD).
Figure 5B:
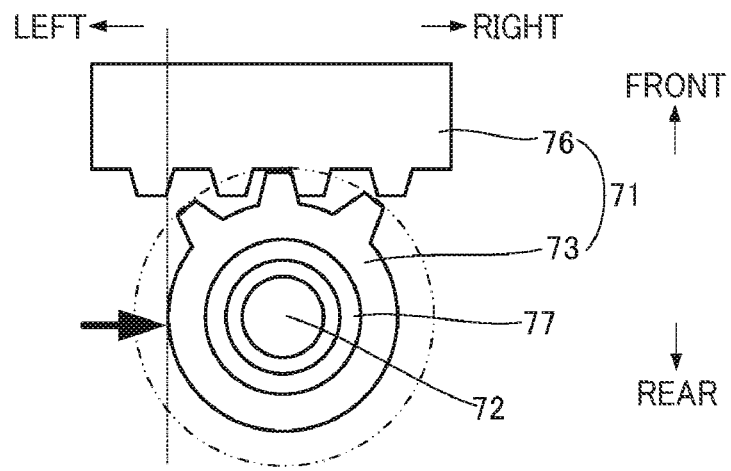
FIG. 5B is a diagram illustrating operation of the automatic gap distribution device (ACD).
Figure 5C:
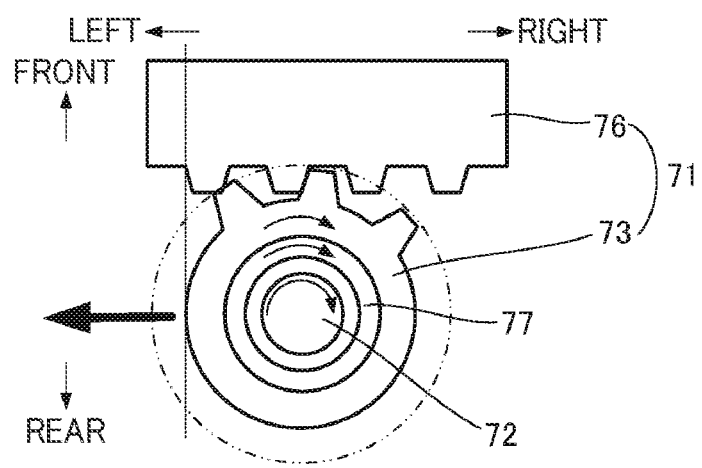
FIG. 5C is a diagram illustrating operation of the automatic gap distribution device (ACD).
Figure 5D:
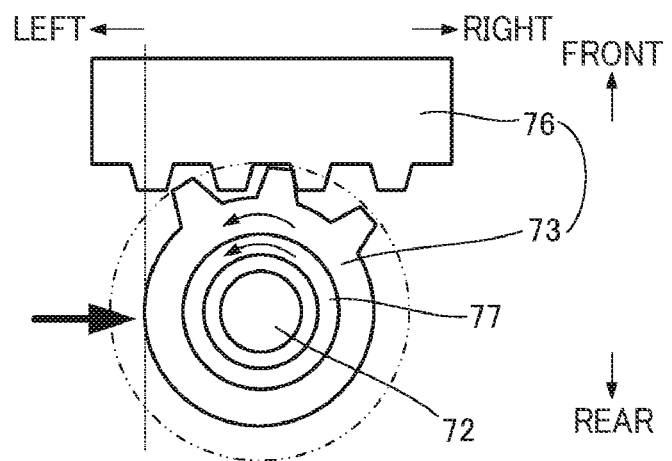
FIG. 5D is a diagram illustrating operation of the automatic gap distribution device (ACD).

As described above, the short lever 12 is pivotally supported by the upper rotary shaft (FIG. 3, reference numeral 33) of the right brake lever (FIG. 3, reference numeral 3R) and swings about the rotary shaft 33 as a single unit together with the bent lever (FIG. 3, reference numeral 11). The collar stop 140 is attached to the short lever 12, so that, when viewed from the front, the collar stop 140 traces an arc-shaped trajectory centering on the rotary shaft 33 as the short lever 12 swings. That is, when viewed from the right, the collar stop 140 reciprocates in the vertical direction.

Figure 7A:
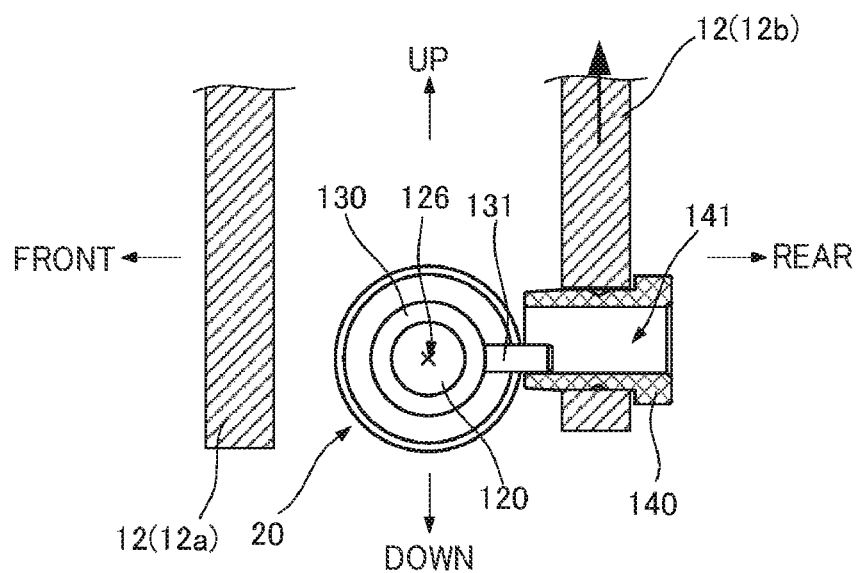
FIG. 7A is a diagram illustrating operation of an automatic wear adjustment device (AWA) provide to a conventional disc brake device and a disc brake device according to an embodiment of the present invention.
Figure 7B:
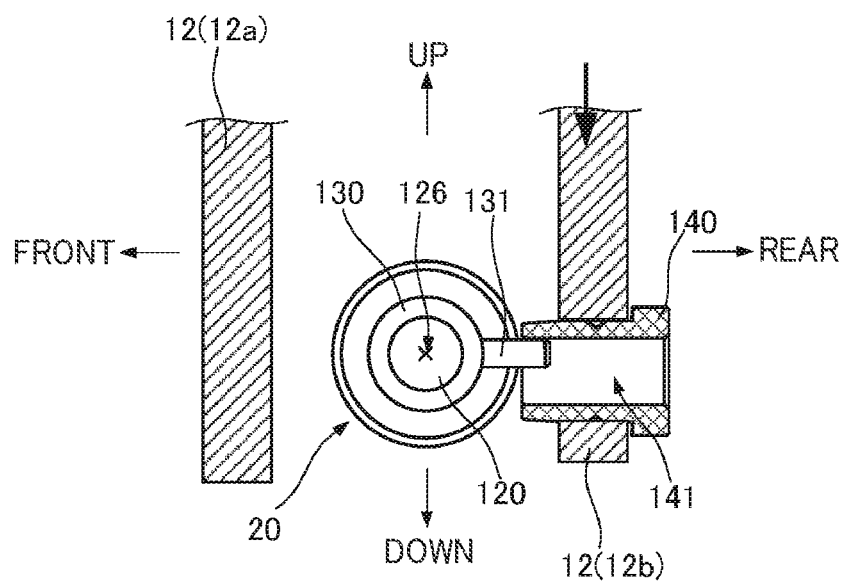
FIG. 7B is a diagram illustrating operation of an automatic wear adjustment device (AWA) provided to the conventional disc brake device and the disc brake device according to an embodiment of the present invention.

First, a case in which there is no wear on the brake linings (FIG. 3, reference numerals 5L, 5R) is described. As illustrated in FIGS. 7A and 7B, even if the collar stop 140 rotates up and down, the engagement pin 131 attached to the one-way clutch 130, although it moves relatively up and down within the hollow portion 141 of the collar stop 140, does not contact the inner surface of the hollow portion 141, and thus the one-way clutch 130 does not rotate via the engagement pin 131.

Figure 7C:
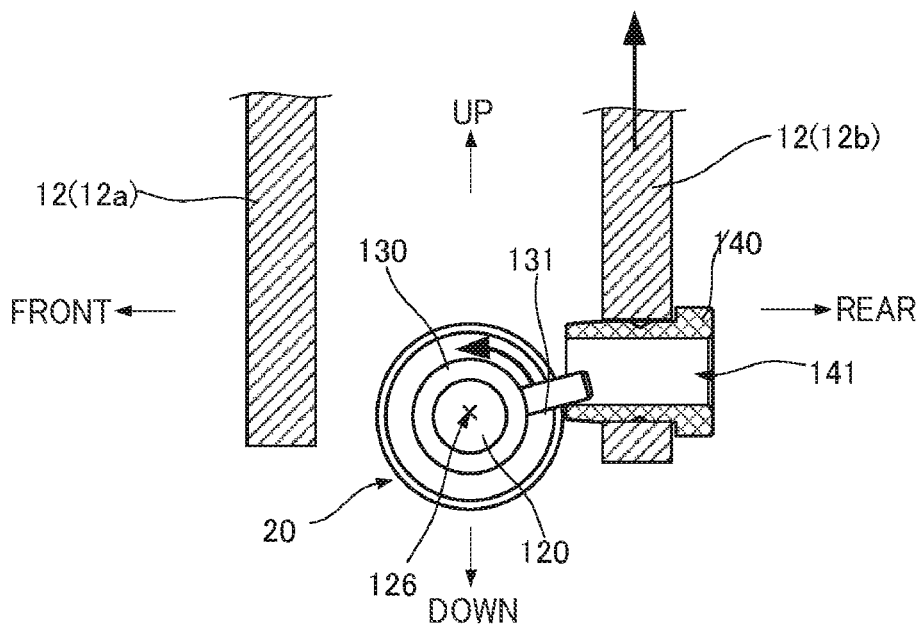
FIG. 7C is a diagram illustrating operation of an automatic wear adjustment device (AWA) provided to the conventional disc brake device and the disc brake device according to an embodiment of the present invention.

However, referring now to FIG. 3, comparing the disc brake device 1 in the closed state when the brake linings (5L, 5R) are worn and when the brake linings (5L, 5R) are not worn, it can be seen that the left end of the bent lever 11 is further lowered downward, and as a result, when viewed from the front, the short lever 12 rotates counterclockwise at a larger rotation angle than when the brake linings (5L, 5R) are not worn. That is, as illustrated in FIG. 7C, the collar stop 140 moves relatively higher with respect to the engagement pin 131. As a result, the engagement pin 131 is pushed up by contacting the lower side of the inner surface of the collar stop 140. At this time, the one-way clutch 130 rotates counterclockwise when viewed from the base end side, but rotates idly with respect to the spindle 120, and the spindle 120 does not rotate.

Figure 7D:
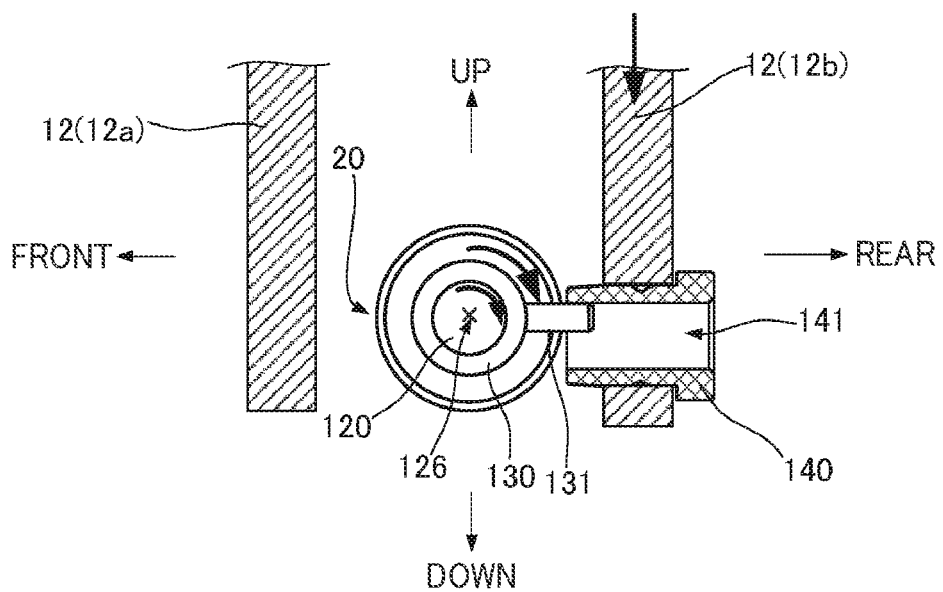
FIG. 7D is a diagram illustrating operation of an automatic wear adjustment device (AWA) provided to the conventional disc brake device and a disc brake device according to an embodiment of the present invention.

Next, when in the open state, as illustrated in FIG. 7D, the engaging pin 131 is pressed downward by contact with the upper inner surface of the collar stop 140 and the one-way clutch 130 rotates clockwise as viewed from the base end side. Thereby, the spindle 120 is screwed into the threaded sleeve (reference numeral 122 in FIG. 6). As a result, the distance between the rotary shafts (23-24) of the respective crosspieces (21, 22) on the front end side and the base end side in the coupling device 20 (hereinafter also referred to as the total length D) is shortened. If the total length D of the coupling device 20 is shortened, then the included angle α of the left and right brake levers (3L, 3R) shown in FIG. 3 is narrowed in the open state, and the gap between the brake disc 2 and the brake linings (5L, 5R) decreases, with the result that the braking force applied to the brake disc 2 in the closed state is maintained in the same manner as before the brake linings (5L, 5R) are worn.

AWA-ACD Linking Mechanism

The disc brake device of this embodiment is characterized by a mechanism that directly links the AWA and the ACD. As described above, the AWA operates by the same mechanism as that of the conventional disc brake device. Regarding the ACD in the disc brake device of the present embodiment, the principle for adjusting the gap itself is the same as that of the conventional ACD. That is, by adjusting the length of the adjustment bolt protruding below the stopper by rotating the adjustment bolt, the left and right brake levers are adjusted so as to swing symmetrically about the brake disc. However, in the disc brake device of the present embodiment, the mechanism for rotating the adjustment bolt in the ACD is not a rack and pinion but a mechanism that is directly linked to the rotary motion of the spindle in the AWA.

Figure 8:
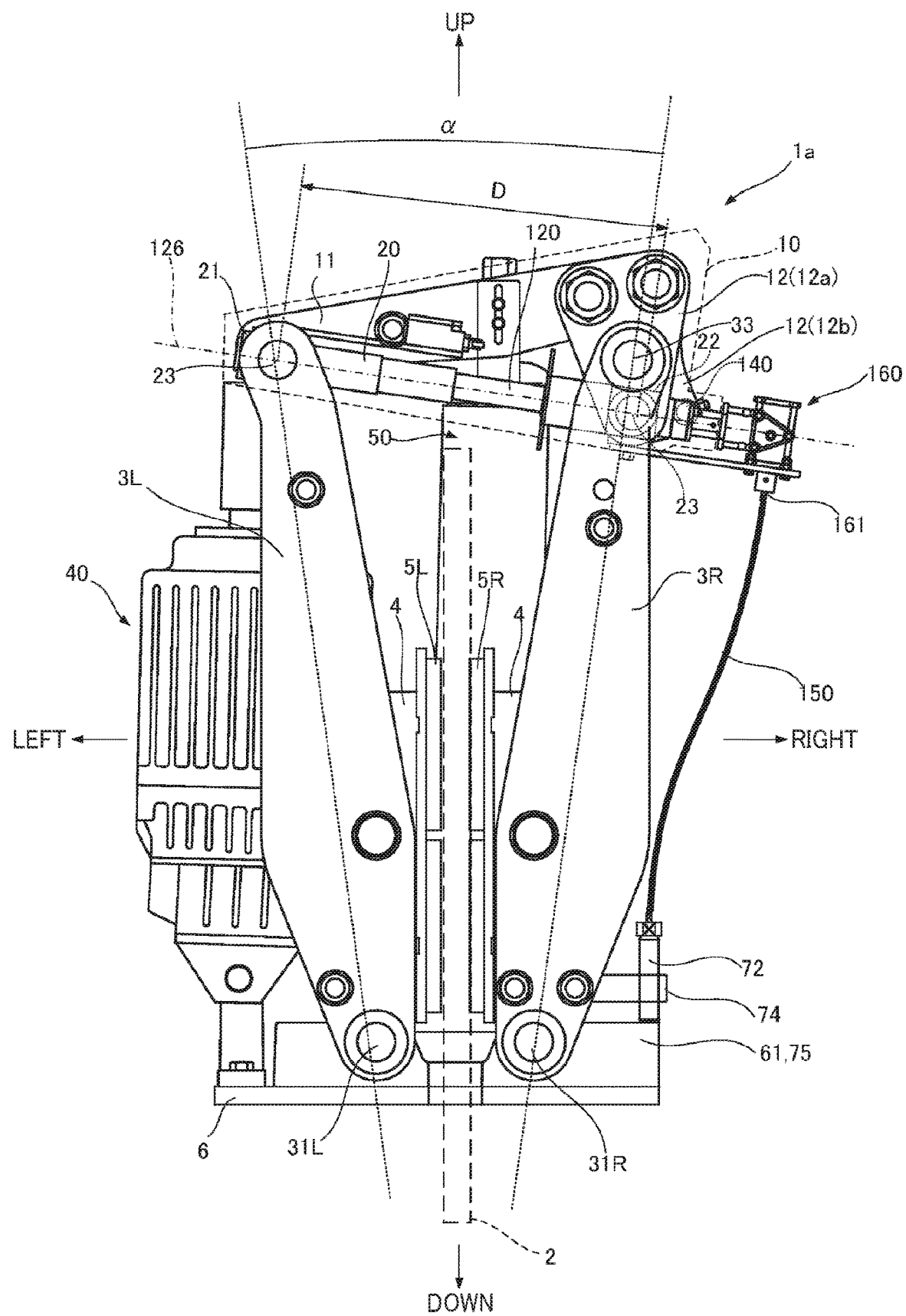
FIG. 8 is a view showing the disc brake device according to an embodiment of the present invention.

FIG. 8 shows a disc brake device 1a according to an embodiment of the present invention. As illustrated in this figure, the disc brake device 1a transmits the rotary motion of the spindle 120, which rotates about the direction of extension of the coupling device 20 as the axis of rotation, to the adjustment bolt 72 via a flexible shaft 150. The flexible shaft 150 is a shaft that can transmit rotary motion while freely changing direction. In this example, a flexible shaft called a "coil-shaped flexible shaft" or "flexible shaft" (hereinafter also referred to as the flexible shaft 150) is used. The flexible shaft 150 has, for example, a structure in which a thin wire and a thick wire are sequentially wound in a reverse winding in a coil shape from the interior toward the exterior.

In this example, a gear box 160 incorporating a bevel gear is connected to the base end of the spindle 120, and one end of the flexible shaft 150 is connected to an output shaft 161 of the gear box 160. The adjustment bolt 72 is connected to the upper end. Further, the bevel gear in the gear box 160 is a reduction gear, and the output shaft 161 is rotated so that the rotation angle is a predetermined ratio with respect to the rotation angle input from the spindle 120, such that the adjustment bolt 72 is rotated by just that rotation angle. When the output shaft 161 of the gear box 160 is viewed from above, it corresponds to the rotational direction when the spindle 120 is viewed from the front end to the base end. As a result, when the spindle 120 rotates clockwise so as to shorten the total length D of the coupling device 20 when viewed from the base end, the flexible shaft 150 rotates the adjustment bolt 72 counterclockwise when viewed from above. In this embodiment, the male screw of the Adjustment bolt 72 and the female screw of the stopper 74 are left-handed screws.

In this manner, the disc brake device 1a according to this embodiment relies mainly on the flexible shaft 150, the speed reduction ratio of the gear box 160, the thread pitch of the male screw formed around the circumference of the spindle 120, the adjustment bolt 72 pitch, the screw direction of the spindle 120 and the adjustment bolt 72 (right screw, left screw) and the like to provide the ACD function. In the disc brake device 1a according to the present embodiment, the flexible shaft 15 directly transmits the rotational movement of the spindle 120 accompanying the operation of the AWA to the adjustment bolt 72 to rotate the adjustment bolt 72. Since the spindle 120 rotates only in one direction by the above-described operation of the AWA, the adjustment bolt 72 does not rotate in a direction that returns the screw. That is, the adjustment bolt 72 does not rotate unless the spindle 120 rotates in a direction that shortens the total length D of the coupling device 20. Therefore, the ACD does not malfunction even if the surface of the brake disc 2 has undulations or unevenness.

The timing at which the ACD operates is the timing at which the AWA operates to enter a closed state. In the closed state, the right brake lever 3R fixing the stopper 74 in place is swung to the left, and the lower end of the adjustment bolt 72 screwed to the stopper 74 is either floating or is not pushed hard against the pedestal 75. That is, the adjustment bolt 72 can be easily rotated. Therefore, the adjustment bolt 72 is rotated reliably and accurately by the rotational torque of the flexible shaft 150. As a result, the gap is automatically adjusted with extremely high accuracy and maintained in that state.

It should be noted that the total length D of the coupling device 20 shortened according to the reduction ratio in the gear box 160 and the state of wear of the brake linings (5L, 5R), the angle α of the left and right brake levers (3L, 3R) in the closed state and the open state according to that length, the pitch of the male screw formed on the outer periphery of the spindle 120, and the pitch of the adjustment bolt 72, can all be changed as appropriate.

FIG. 9 is an explanatory diagram relating to the dimensions and angles of each part of the disc brake device 1a. FIG. 9 is a front view of the disc brake device 1a according to the present embodiment as viewed from the front. In the drawing, the dimensions of each part are indicated by various symbols. Thus, the vertical distance from the rotary shafts (31L, 31R) of the brake levers (3L, 3R) to the vertical center position of the brake linings (5L, 5R) is A, the vertical distance from the center position of the brake linings (5L, 5R) to the vertical position where the crosspiece 21 on the front end side of the coupling device 20 is pivotally supported by the left brake lever 3L is B, and the distance in the lateral direction from the rotary shaft 31R of the right brake lever 3R to the lower end of the adjustment bolt 72 is C. In addition, the angle of inclination of the coupling device 20 with respect to the horizontal direction parallel to the horizontal plane is θ, the pitch of the spindle 120 is P1, and the pitch of the adjustment bolts 72 is P2. The above-described AWA adjusts the total length D of the coupling device 20 so as to keep the angle of inclination θ constant according to the wear of the brake linings (5L, 5R).

It should be noted that the dimensions and angles of each part of the disc brake device 1 illustrated in FIGS. 8 and 9 (A, B, C, θ, P1, P2) and the rotation angle that is the difference of the included angle α between the open and closed states, the reduction ratio of the gear box 160, and the length by which the adjustment bolt 72 is screwed in from a state in which the brake linings (5L, 5R) are not worn to a worn state that requires replacement of the brake linings (5L, 5R) can be designed as appropriate. In any case, in the disc brake device 1a according to the present embodiment, the dimensions, angles, pitches, reduction ratios, and the like of the above portions are set as appropriate, and when the thicknesses in the left and right directions of each of the brake linings (5L, 5R) is worn down, the distance between the brake pads (5L, 5R) and the brake disc 2 in the open state can be reduced by an amount equivalent to the reduction in thickness due to wear.

Other Embodiments

In the above-described embodiments, the direction of the axis of rotation of the spindle is changed to a substantially vertical direction using a bevel gear. However, if the installation space of the disc brake device permits, the flexible shaft may be directly mounted to the rotary shaft of the spindle, or the flexible shaft may be curved downward while extended along the length of the direction of the axis of rotation and connected to the adjustment bolt. Alternatively, a non-flexible shaft such as a metal shaft can be attached to the output shaft and adjustment bolt of the gear box, and the flexible shaft can be connected to the tip of the shaft. In any case, if the flexible shaft is interposed in any part of the path from the base end of the spindle to the adjustment bolt, the adjustment bolt can be rotated by the rotation of the spindle even if the relative positions of each part may change with the opening/closing operation of the disc brake device.

Of course, the flexible shaft is not limited to a flexible shaft as such, and may comprise a universal joint-type flexible shaft connected by a short rigid shaft (also called a universal joint). Alternatively, a flexible shaft in which a flexible shaft and a universal joint-type flexible shaft are combined may be used. In any case, an appropriate flexible shaft can be adopted according to the installation environment of the disc brake device, the manufacturing cost, the durability required for the flexible shaft, and the like.

As an appropriate gear mechanism, in addition to various bevel gears (such as a bevel gear, a spiral bevel gear, a Zerol bevel gear, etc.), a face gear, a high void gear, etc., can be used as the gear mechanism for converting the axis of rotation of the spindle into an axis of rotation extending downward. Of course, a single gear mechanism may be a combination of a plurality of different gear mechanisms.

In the above-described embodiment, since the pitch of the adjustment bolt used is too large, when the adjustment bolt and the spindle rotate by the same rotation angle, the adjustment bolt protrudes excessively downward with respect to the stopper. Therefore, the difference in the rotation angle between the spindle and the adjustment bolt is adjusted by the reduction ratio of the gear of the gear box so that when the spindle rotates by a predetermined angle, the adjustment bolt protrudes for a predetermined length with respect to the stopper. Of course, in the above-described embodiment, even if the gear ratio in the gearbox is constant, if the ratio between the pitch of the spindle and the pitch of the adjustment bolt is set appropriately, when the spindle has rotated by a predetermined rotation angle the adjustment bolt can be protruded downward with respect to the stopper by a desired length. For example, in the above-described embodiment, if the gear ratio of the gearbox is ½, the gear ratio may be set to 1 and the pitch of the adjustment bolts may be halved.

Moreover, in a case in which the pitch of one of the spindle and the adjustment bolt becomes excessive (e.g., 6 mm or more), multiple threads may be employed on the spindle and the control bolt. Specifically, if one lead screw is used for both the spindle and the adjustment bolt and an attempt is made to increase the ratio of the leads of both the spindle and the adjustment bolt, the pitch of one of the spindle and the adjustment bolt may become excessive. When the pitch becomes excessive, the dimensions of the external threads of the spindle and the adjustment bolt and the thread of the internal thread that is the counterpart to these external threads become large. If the thread becomes large, it becomes difficult to machine the screw accurately. Furthermore, in order to form a large thread, it is necessary to cut a large volume, which increases the time and cost required for machining.

In the case of a single-thread male screw, when the pitch is increased, the groove of the screw becomes deeper and the diameter of the base becomes smaller. Therefore, the strength of the member on which the male screw is formed is reduced. For example, the spindle is also a part of the linking mechanism and must be sufficiently strong. The threaded sleeve female thread that is the counterpart to the male thread of the spindle is also thin if the outer diameter is the same. Therefore, in particular, it is difficult to adopt a single-thread screw having a large pitch, which might well have insufficient strength, for the male screw of the spindle and the female screw of the threaded sleeve. Accordingly, if these screws are multi-threaded, the pitch can be reduced while maintaining the leads so as to ensure machining accuracy and sufficient strength. Of course, the number of threads of the multi-thread can be set as appropriate according to the ratio between the lead of the spindle and the lead of the adjustment bolt or the machining accuracy. In any case, the disc brake device only requires a configuration in which, when the spindle rotates by a predetermined rotation angle, the adjustment bolt is screwed via the flexible shaft and proceeds downward for a predetermined length.

In the above-described embodiment, the spindle is a right-handed thread and the adjustment bolt is a left-handed thread, so that when the spindle rotates in the direction of shortening the coupling device, the adjustment bolt rotates in the direction to be screwed into the stopper and the lower end side of the adjustment bolt protrudes further downward with respect to the stopper. Of course, the flexible shaft may be rotated in a state in which the direction of rotation of the spindle is reversed using the gear. In doing so, an ordinary right-handed thread can be used for the adjustment bolt.

LIST OF REFERENCE SYMBOLS 1, 1a Disc brake device
2 Brake disc
3L, 3R Brake levers
4 Brake shoe
5L, 5R Brake linings
6 Base plate
10 Linking mechanism
11, 11a, 11b Bent levers
12, 12a, 12b Short levers
20 Coupling device
21, 22 Crosspieces of coupling device
40 Thruster
50 Spring mechanism
72 Adjustment bolt
74 Stopper
75 Pedestal
120 Spindle
130 One-way clutch
140 Collar stop
150 Flexible shaft (flexible shaft)
160 Gearbox

The invention claimed is:

1. A disc brake device that sandwiches a brake disc between left and right brake linings disposed opposite and facing each other across the brake disc in a lateral direction to brake the rotation of the brake disc, the disc brake device comprising:
  left and right brake levers each having rotary shafts extending in a longitudinal direction at lower ends thereof, with a brake lining installed on each of the left and right brake levers;
  a linking mechanism configured to alternately swing the left and right brake levers toward and away from each other, the linking mechanism including:
    a lever mechanism extended in the lateral direction above the left and right brake levers, the lever mechanism having a rotary shaft extending in the longitudinal direction at one of a left end and a right end thereof, is rotatably supported at an upper end side of one of the left and right brake levers, and is extended toward an upper end side of the other of the left and right brake levers; and
    a rod-shaped coupling device having spindle having an axis of rotation in a rod-shaped axial direction, wherein the spindle is rotated in a predetermined direction to reduce an overall length of the coupling device itself;
  a thruster provided with a vertically movable rod an upper end of which is attached via a rotary shaft to an end portion of the other of the left and right ends of the lever mechanism, such that by raising the rod the thruster causes the linking mechanism to move the left and right brake levers away from each other so that the brake is released in an open state;
  a spring mechanism attached at a predetermined position of the lever mechanism via a rotary shaft, which urges the lever mechanism to maintain the closed state by a restoring force of a spring and causes the linking mechanism to move the left and right brake levers toward each other to put the brake in a closed state when the thruster is not operating;
  an automatic wear adjustment device provided with a one-way clutch that rotates the spindle in one direction only to shorten the overall length of the coupling device according to the relative displacement of the positions of each of the left and right end portions of the lever mechanism and the coupling device, thereby adjusting an included angle between the left and right brake levers in the open state according to a state of wear of the brake linings; and
  an automatic gap distribution device that, in the open state, equalizes an interval in the lateral direction between each of the left and right brake linings and the brake disc, the automatic gap distribution device including:
    an adjustment bolt that passes vertically through a stopper while being screwed into the stopper, the stopper protruding outward in the left and right direction at the lower end of one of the left and right brake levers;
    a base that supports a lower end of the adjustment bolt; and
    a flexible shaft that is interposed between the spindle and the adjustment bolt to interlock the rotation of the spindle and the adjustment bolt,
  wherein, as the spindle rotates to shorten the coupling device, the adjustment bolt is rotated so as to protrude downward with respect to the stopper,
  wherein, as the adjustment bolt is rotated so as to protrude downward with respect to the stopper, in the open state the lower end of the adjustment bolt contacts the pedestal, the swinging of one of the left and right brake levers is restricted, the swinging of one of the left and right brake lever coupled to the other of the left and right brake lever via the linking mechanism is also restricted, and the left and right brake levers are adjusted to be symmetrical with respect to the brake disc.

2. The disc brake device according to claim 1, wherein the flexible shaft is a coil-type flexible shaft.

3. The disc brake device according to claim 1, wherein the flexible shaft is a universal joint-type flexible shaft.

4. The disc brake device according to claim 1, comprising a transmission gear interposed between the flexible shaft and the spindle.

5. The disc brake device according to claim 1, wherein the automatic gap distribution apparatus causes the adjustment bolt to protrude downward relative to the stopper as the spindle rotates by a predetermined angle according to a ratio between a pitch of the spindle and the pitch of the adjustment bolt.

6. The disc brake device according to claim 1, comprising a gear mechanism for converting an axis of rotation of the spindle into an axis of rotation extending downward.

* * * * *